United States Patent [19]

Spitznagel

[11] Patent Number: 5,051,043

[45] Date of Patent: Sep. 24, 1991

[54] SPOT WELD DRILL GUIDE

[76] Inventor: Max W. A. Spitznagel, 13207 Warren Ave., Los Angeles, Calif. 90066

[21] Appl. No.: 442,233

[22] Filed: Nov. 28, 1989

[51] Int. Cl.⁵ .............................................. B23B 49/00
[52] U.S. Cl. .................................. 408/72 R; 408/241 S
[58] Field of Search ............... 408/204, 207, 209, 112, 408/14, 118, 110, 202, 241 S, 72 D, 72 R, 111, 119, 115 B, 241 B, 84, 81

[56] References Cited

U.S. PATENT DOCUMENTS

| | | | |
|---|---|---|---|
| 2,296,087 | 9/1942 | Burns, Jr. ........................... | 408/84 X |
| 2,359,859 | 10/1944 | Jarvis ................................ | 408/202 X |
| 2,375,112 | 5/1975 | Kanihan ........................... | 408/112 X |
| 2,608,114 | 8/1952 | Martin et al. .................... | 408/202 X |
| 2,710,549 | 6/1955 | Cogsdill .......................... | 408/202 X |
| 3,320,832 | 5/1967 | Jensen .............................. | 408/202 X |
| 3,336,611 | 8/1967 | Schepp ............................ | 408/202 X |
| 3,758,221 | 9/1973 | Meshulam .......................... | 408/204 |
| 4,105,359 | 8/1978 | Schneider et al. ................. | 408/112 |
| 4,115,017 | 9/1978 | Wilhelmsson ............... | 408/241 S X |
| 4,802,798 | 2/1989 | Adamson .................... | 408/241 S X |

Primary Examiner—Larry I. Schwartz
Assistant Examiner—R. L. Schultz
Attorney, Agent, or Firm—Pretty, Schroeder, Brueggemann & Clark

[57] ABSTRACT

A small, lightweight spot weld drill guide attached to a conventional drill motor and includes a guide housing having a reference surface defining a reference position that is positionable against a surface being drilled, a drill shaft disposed partly within the guide housing, a bearing supporting the drill shaft within the guide housing and a locking assembly controlling the length of travel of the drill shaft within the guide housing. Windows adjacent the reference surface of the guide housing enable the drill bit to be accurately positioned over a spot weld prior to drilling to a precise, predetermined bore depth.

8 Claims, 2 Drawing Sheets

SPOT WELD DRILL GUIDE

BACKGROUND OF THE INVENTION

A spot weld is a commonly used technique for holding two pieces of sheet metal or other material together. A spot weld is formed by placing two pieces of sheet metal in facing contact with each other and connecting the two sheets into an electric welding circuit. Two small diameter cylindrical electrodes are placed on opposite sides of the position to be welded. The two surfaces to be welded are compressed together by the electrodes as electrical current is passed between the electrodes to heat the spot weld area. The interface between the two metal sheets becomes heated sufficiently to weld the two sheets together at a small spot in the vicinity of the two electrodes.

A common application for spot welding is in automobiles where fender quarter panels or other body parts are secured to structural members. It is often necessary to remove these panels, such as when an automobile must be repaired following an accident.

In addition to removal of a panel for repair or replacement following an accident, it is often necessary to remove an undamaged panel from an automobile that is being salvaged. After removal the panel is then substituted for a panel that has been damaged.

Welded panels are typically removed by drilling out the spot weld with a drill bit that is roughly equal in diameter to the diameter of the spot weld region. In order to minimize damage to the parts involved, it is desirable to drill through one of the two fastened parts only to the depth of the facing surfaces between the two parts. In this way only one of the parts is damaged by the drill and the other remains substantially intact.

Where a damaged fender panel is being removed one would drill through the fender and preserve the body mounting. Alternatively, where a good fender is being removed for use on a different vehicle, it is desirable to drill through the body member and preserve the integrity of the fender panel.

However, metal is a difficult material to drill through and frequently the spot welds are positioned in inconvenient, hard to get at locations. It can thus be quit difficult to drill through the spot weld interface without drilling at least part way through the second panel. The problem becomes even worse when relatively unskilled labor is used to perform the drilling operation.

It is thus highly desirable to have a guide that can control the depth of the drilling operation. One such guide is known that has an L-shaped guide member. The leg of the L is hooked over the back side of the panel joint and provides a reference plane for controlling the depth of the drilled hole. The hole is drilled to within a selected distance of the leg.

While this arrangement is satisfactory for readily accessible applications, it can not be used in hard to reach locations or where the distance form a panel edge to a spot weld is greater than the leg of the L, since the leg must be hooked over the edge of the panel. A need thus exists for a spot weld drill guide that can be used in hard to reach locations and where the spot weld is a substantial distance from an edge of a panel.

SUMMARY OF THE INVENTION

A small, unobtrusive, light weight spot weld drill guide in accordance with the invention includes a generally cylindrical outer drill guide housing having a slotted reference end defining a reference surface, a central drill shaft securing a drill bit and a stop mechanism limiting axial motion of the drill shaft relative to the guide housing. A bushing connects the rotating drill shaft to the guide housing so as to facilitate relative rotation and axial translation between them.

Because the guide housing is only slightly larger than the drill bit and provides a reference surface on the surface that is being drilled, the drill guide can be used for interior spot welds and various locations that would otherwise be hard to reach. The drill shaft may be connected to a suitable power source such as a conventional ⅜ inch drill motor which provides the torque required for rotation of the drill.

BRIEF DESCRIPTION OF THE DRAWINGS

A better understanding of the invention may be had from a consideration of the following detailed description, taken in conjunction with the accompanying drawings in which.

DETAILED DESCRIPTION OF THE INVENTION

Figure 1:
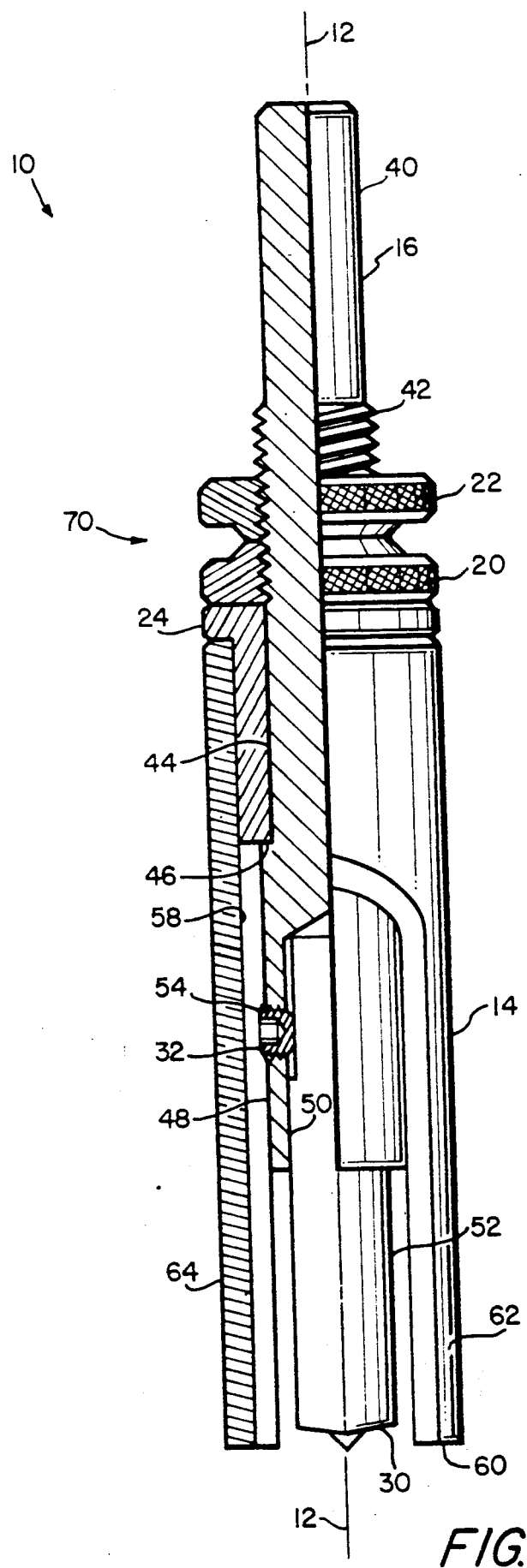
FIG. 1 is a front plan view, partly broken away of a spot weld drill guide in accordance with the invention.
Figure 2:
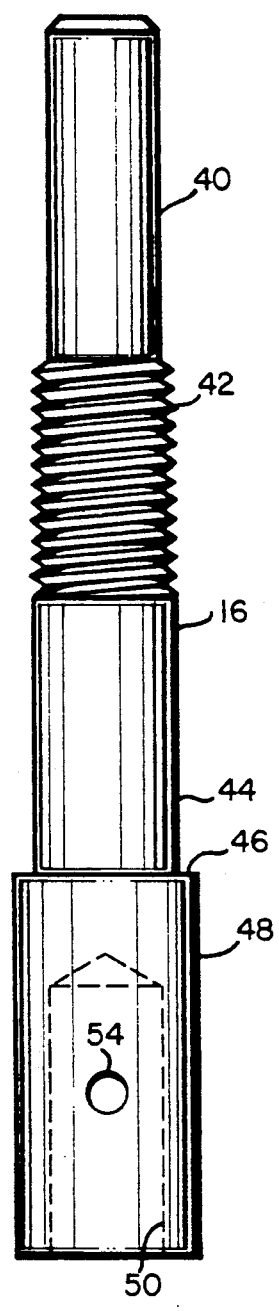
FIG. 2 is a plan view of a cylindrical drill shaft used in the drill guide shown in FIG. 1.
Figure 3:
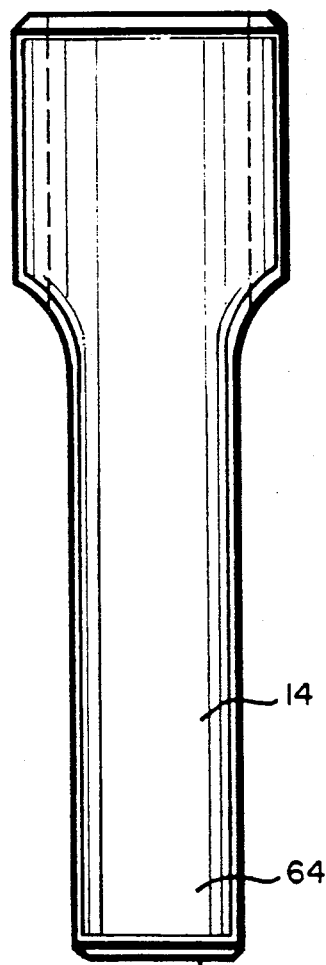
FIG. 3 is a plan view of a guide housing used in the drill guide shown in FIG. 1.
Figure 4:
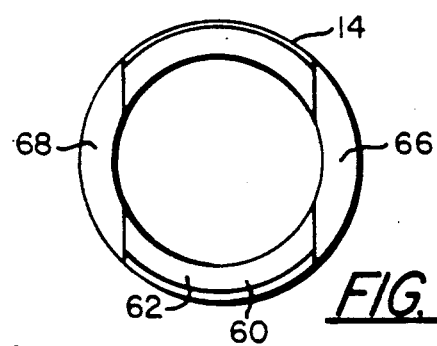
FIG. 4 is an end view, taken from the reference end of the guide housing shown in FIG. 3.
Figure 5:
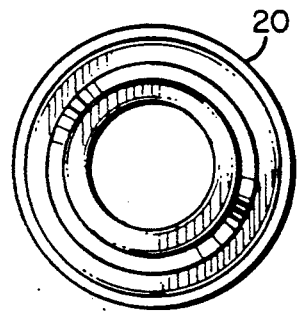
FIG. 5 is a plan view of a lock nut used in the guide housing shown in FIG. 1.
Figure 6:
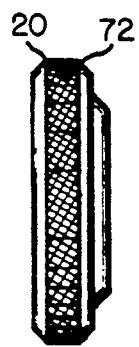
FIG. 6 is an edge view of the lock not shown in FIG. 5.

Referring now to FIG. 1 a small, generally cylindrical spot weld drill guide 10 in accordance with the invention includes a central axis 12 having disposed therealong an outer guide housing 14, a drill shaft 16 rotatably and axially translatably disposed within guide housing 14, a pair of lock nuts 20, 22 forming a locking assembly and a bearing 24 coupling the guide housing 14 to the drill shaft 16. A drill bit 30 has a noncutting shank end inserted into a distal end of the drill shaft 16 and secured in place by a set screw 32.

The drill shaft 16 has a 0.320 inch diameter coupling section 40 at one end which is approximately 0.8 inch long. This section 40 is preferably case hardened to enable insertion into a conventional ⅜ inch drill motor chuck without deformation or damage. The coupling section 40 is followed by a 0.375 inch outside diameter threaded section 42 which is approximately 0.632 inches long. Section 42 is followed by a bearing section 44 of the same diameter and length.

A flange surface 46 provides a transition from the bearing section 44 to a larger diameter distal bit holder section 48. Flange surface 46 serves as a stop to prevent upward motion of the flange surface 46 beyond bearing 44. Bit holder section 48 has an outside diameter of 0.500 inch and a length of 1.00 inch. A 0.312 inch diameter bore 50 is drilled into the distal end of holder section 48 to a depth of about 6.700 inch to receive the shank of a 6.5 mm drill bit 52. A tapped set screw hole 54 is positioned 0.450 inch from the distal end of shaft 16 to receive a #8 set screw.

While an adjustable chuck could be attached to shaft 16 to hold different sizes of drill bits, it is preferred to minimize the size of the drill guide 10 by providing a fixed diameter bore 50 within the distal end of shaft 16. However, the use of a fixed size bore 50 requires a different bore size and hence a different tool for each different size of drill bit that is to be used. However, since 6.5 mm and 8.5 mm bits are sufficient for most spot weld removing applications only two different sizes need be maintained in most instances.

The guide housing 14 is a cylindrical member 2.5 inches long and 0.75 inch in diameter. A 0.56 inch diameter internal bore 58 extends therethrough. The distal end is milled from opposite sides to a width of 0.5 inch for a distance of 1.75 inches along the axis from a reference surface 60 defining a reference position to form two longitudinally extending fingers 62, 64 having two slots or windows 66, 68 defined between them. The windows 66, 68 enable an operator to easily view and position the drill bit 30 during operation.

Bearing 24, which may be an Oilite bushing is force fit into the central bore 58 of guide housing 14 at a second end thereof opposite the reference end. Bearing 24 receives the drill shaft 16 from the distal end in rotating and sliding relationship until the distal end of bearing 24 engages the transition flange 46 of drill shaft 16.

A locking assembly 70 is then completed by threading lock nuts 20, 22 onto the threaded section 42 of drill shaft 16. Lock nut 20 is positioned to allow the cutting end of drill bit 70 to reach a desired bore depth as lock nut 20 engages the top of bearing 24. Lock nut 22 is then tightened against lock nut 20 to assure that the locking assembly 70 retains the desired adjustment. The lock nuts 20, 22 may be conventional nuts having internal threads engaging threaded section 42 and a knurled outer surface 72 to facilitate manual adjustment of the nuts 20, 22.

In operation, the shank of a drill bit 30 is inserted into bore 50 and secured by set screw 32. The nuts 20, 22 are then positioned to allow drill bit 30 to extend longitudinally to a desired depth beyond reference surface 60. The coupling section 40 is then secured within the chuck of a conventional drill motor (not shown). Next the cutting end of drill bit 30 is centered over the spot weld that is to be drill out with reference surface 60 adjacent the near surface of the panel that is being drilled.

The drill is then stared and a hole is drilled to a depth at which nut 20 engages bearing 24. If the locking assembly 70 has been properly adjusted, the bore will be sufficiently deep to drill out the spot weld without significantly penetrating the second panel.

While there has been shown and described above a spot weld drill guide for the purpose of enabling a person of ordinary skill in the art to make and use the invention, it will be appreciated that the invention is not limited to the particular embodiment that has been disclosed. Accordingly, any modifications, variations or equivalent arrangements within the scope of the attached claims should be considered to be within the scope of the invention.

What is claimed is:

1. A spot weld drill guide comprising:
a guide housing disposed along a central axis with a reference position at one end thereof and a central bore extending therein;
a drill shaft disposed within the central bore of the guide housing with a distal end being adapted to receive and secure a drill bit and an opposite end extending beyond the guide housing for connection to a drill motor, the drill shaft having a flange disposed thereon between the distal and opposite ends thereof and the drill shaft being rotatable with respect to the guide housing and being axially slideable relative to the guide housing;
a locking assembly disposed to limit travel of the drill shaft relative to the guide housing such that a drill bit secured by the drill shaft extends to a selected distance beyond the reference position of the guide housing to limit the depth of a drilled hose relative to a surface being drilled, the locking assembly being fixedly secured to the drill shaft in axially spaced apart relationship to the flange with the axial spacing between the locking assembly and flange being adjustable to thereby enable adjustment of a range of axial motion between the drill shaft and the housing; and
a bearing secured to the guide housing in fixed relationship thereto, the bearing slideably and rotatably receiving the drill shaft and being axially constrained to slide between the flange and the locking assembly.

2. A spot weld drill guide according to claim 1 wherein the guide housing has a generally cylindrical member having a central axial bore and at least one axial slot adjacent the reference position providing a window through which a cutting end of a drill bit held by the drill shaft may be observed by an operator while the drill bit is being positioned on the surface being drilled.

3. A spot weld drill guide according to claim 1 wherein the drill shaft has a threaded section between the ends thereof and the locking assembly includes a pair of lock nuts threadedly engaging the threaded section at a position therealong selected to provide a desired bore depth.

4. A spot weld drill guide according to claim 1 wherein the drill shaft has an axial bore in a distal end thereof for receiving a shaft of a drill bit and a threaded aperture through a side wall thereof which communicates with the axial bore, and further comprising a set screw engaging the threaded aperture and positioned to secure a shank of a drill bit within the axial bore.

5. A small, generally cylindrical spot weld drill guide providing a reference surface on a side of a bore from which the bore is drilled, the drill guide comprising:
a cylindrical drill shaft having a coupling end for connection to a drill motor, an axially extending central bore in a distal end opposite the coupling end for receiving a securing a shank of a drill bit, a threaded region intermediate the coupling end and the distal end and a flange spaced apart from the threaded region;
a guide housing having a central axial bore therethrough, the guide housing receiving the drill shaft with the coupling end and threaded section extending beyond a near end of the guide housing, the guide housing having a reference position on a distal end opposite the near end;
a locking assembly threadedly engaging the threaded section of the drill shaft at an axially adjustable position thereon to limit axial motion thereof relative to the guide housing to limit the extent by which a cutting end of a drill bit secured by the drill shaft can extend beyond the reference position; and
a bearing secured in fixed relationship to the housing, the bearing axially slideably receiving the drill shaft and being contrained to slide between the locking assembly and the flange to thereby limit sliding motion between the guide housing and the drill shaft.

6. A spot weld drill guide that is operable entirely from an entry side of a panel in which a hole is drilled and limits a depth to which the hole is drilled, the drill guide comprising:
 a guide housing having a reference position suitable for engaging a surface of a panel in which a hole is to be drilled at a reference end and a second end opposite the reference end, the guide housing having a central axial bore therethrough;
 a drill shaft disposed partially within the guide housing and having a coupling end extending from an end of the guide housing opposite the reference position, the drill shaft including means for receiving and securing a drill bit at an end thereof opposite the coupling end; and
 means for limiting axial motion of the drill shaft relative to the guide housing to thereby limit a depth of a hole that can be drilled through a spot weld using the spot weld drill guide, the limiting means including a pair of stops fixedly secured to the drill shaft with an adjustable spacing between them and a bearing secured to the guide housing in fixed relationship, the bearing slideably receiving the drill shaft in axially slideable and rotatable relationship and being slideably constrained between the pair of stops.

7. A spot weld guide assembly according to claim 6 wherein the bearing is secured to the guide housing by a force fit.

8. A spot weld guide assembly according to claim 6 wherein one of the pair of stops of the limiting means comprises a pair of lock nuts adjustably secured to the drill shaft.

* * * * *